(12) United States Patent
Schwendeman et al.

(10) Patent No.: US 7,907,322 B2
(45) Date of Patent: Mar. 15, 2011

(54) ELECTROCHROMIC DEVICE

(75) Inventors: Irina G. Schwendeman, Wexford, PA (US); Adam D. Polcyn, Pittsburgh, PA (US); James J. Finley, Pittsburgh, PA (US); Cheri M. Boykin, Kingsport, TN (US); Julianna M. Knowles, Apollo, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 84 days.

(21) Appl. No.: 12/256,587

(22) Filed: Oct. 23, 2008

(65) Prior Publication Data
US 2010/0103496 A1   Apr. 29, 2010

(51) Int. Cl.
G02F 1/15 (2006.01)
G02F 1/03 (2006.01)
G09G 3/38 (2006.01)
H04N 9/16 (2006.01)

(52) U.S. Cl. ......... 359/265; 359/245; 345/105; 348/817
(58) Field of Classification Search .......... 359/265–275, 359/277, 245–247, 254, 242; 345/49, 105; 250/70; 348/817; 438/929
See application file for complete search history.

(56) References Cited

U.S. PATENT DOCUMENTS

| | | | |
|---|---|---|---|
| 4,610,771 A | 9/1986 | Gillery | |
| 4,716,086 A | 12/1987 | Gillery et al. | |
| 4,726,664 A * | 2/1988 | Tada et al. | 359/275 |
| 4,746,347 A | 5/1988 | Sensi | |
| 4,792,536 A | 12/1988 | Pecoraro et al. | |
| 4,806,220 A | 2/1989 | Finley | |
| 4,834,857 A | 5/1989 | Gillery | |
| 4,898,789 A | 2/1990 | Finley | |
| 4,898,790 A | 2/1990 | Finley | |
| 4,902,580 A | 2/1990 | Gillery | |
| 4,948,677 A | 8/1990 | Gillery | |
| 5,028,759 A | 7/1991 | Finley | |
| 5,030,593 A | 7/1991 | Heithoff | |
| 5,030,594 A | 7/1991 | Heithoff | |
| 5,059,295 A | 10/1991 | Finley | |
| 5,240,886 A | 8/1993 | Gulotta et al. | |
| 5,385,872 A | 1/1995 | Gulotta et al. | |
| 5,393,593 A | 2/1995 | Gulotta et al. | |
| 5,821,001 A | 10/1998 | Arbab et al. | |
| 6,495,251 B1 | 12/2002 | Arbab et al. | |
| 6,667,825 B2 | 12/2003 | Lu et al. | |
| 6,828,062 B2 | 12/2004 | Lu et al. | |
| 2005/0025700 A1 * | 2/2005 | Bulian et al. | 423/606 |
| 2006/0203322 A1 * | 9/2006 | Radmard et al. | 359/265 |
| 2008/0209876 A1 * | 9/2008 | Miller | 55/522 |

* cited by examiner

Primary Examiner — Scott J Sugarman
Assistant Examiner — Dawayne A Pinkney
(74) Attorney, Agent, or Firm — Andrew C. Siminerio

(57) ABSTRACT

An electrochromic device includes a first substrate spaced from a second substrate. A first conductive member is formed over at least a portion of the first substrate. A first electrochromic material is formed over at least a portion of the first conductive member. The first electrochromic material includes an organic material. A second conductive member is formed over at least a portion of the second substrate. A second electrochromic material is formed over at least a portion of the second conductive member. The second electrochromic material includes an inorganic material. An ionic liquid is positioned between the first electrochromic material and the second electrochromic material.

13 Claims, 1 Drawing Sheet

ELECTROCHROMIC DEVICE

NOTICE OF GOVERNMENT SUPPORT

THIS INVENTION WAS MADE WITH GOVERNMENT SUPPORT UNDER CONTRACT NO. DE-FC26-06NT42763 AWARDED BY THE DEPARTMENT OF ENERGY. THE UNITED STATES GOVERNMENT MAY HAVE CERTAIN RIGHTS IN THIS INVENTION.

BACKGROUND OF THE INVENTION

1. Field of the Invention

The present invention relates generally to electrochromic devices and, in one particular aspect, to an electrochromic device utilizing an organic electrochromic material on one electrode and an inorganic electrochromic material on another electrode.

2. Description of the Current Technology

Various techniques are currently utilized in order to increase the energy efficiency of architectural windows, e.g., to control the amount of solar radiation transmitted through the windows. One technique is to apply a solar control coating onto the window to block certain ranges of electromagnetic radiation. Such conventional coatings are designed to transmit a high percentage of visible light but to block ranges in the solar infrared and/or solar ultraviolet ranges to reduce the heat load in the interior of the building. A drawback to these systems is that they are non-dynamic. That is, they do not have the capacity to vary the solar energy transmittance through the window. For example, while it may be desirable to block or reduce the transmission of solar energy through the window during the hot summer months to decrease the interior heat load, it may be desirable to increase the solar energy transmittance through the window during the winter months to increase the interior heat load.

One technique to solve this problem has been the use of electrochromic technology. Conventional electrochromic windows use an electrochromic medium that changes color upon the application of an electrical potential. These conventional electrochromic windows typically darken upon the application of an electrical potential to reduce transmittance and lighten upon the removal of the electrical potential. Such electrochromic devices are finding more acceptance in various areas of commercial activity, such as architectural windows and vehicle windows. However, there are problems associated with these conventional electrochromic devices. For example, these devices are typically expensive to produce and install. Also, the components of these devices can degrade over time due to heat, exposure to solar radiation, or repeated cycling from dark to light, making the device slower to recover to the lightened state.

Therefore, it would be desirable to provide an electrochromic device having advantages over electrochromic devices currently available.

SUMMARY OF THE INVENTION

An electrochromic device includes a first substrate spaced from a second substrate. A first conductive member is formed over at least a portion of the first substrate. A first electrochromic material is formed over at least a portion of the first conductive member. The first electrochromic material includes an organic material. A second conductive member is formed over at least a portion of the second substrate. A second electrochromic material is formed over at least a portion of the second conductive member. The second electrochromic material includes an inorganic material. An ionic liquid is positioned between the first electrochromic material and the second electrochromic material.

Another electrochromic device comprises a first glass substrate spaced from a second glass substrate. A first conductive member is formed over at least a portion of the first substrate and comprises at least one conductive metal oxide. A first electrochromic material comprising at least one semi-conducting cathodically coloring polymer is formed over at least a portion of the first conductive member. A second conductive member is formed over at least a portion of the second substrate and comprises at least one conductive metal oxide. A second electrochromic material is formed over at least a portion of the second conductive member and comprises at least one anodically coloring inorganic material. An ionic liquid is positioned between the first and second electrochromic materials.

A further electrochromic device comprises a first glass substrate spaced from a second glass substrate. A first conductive member is formed over at least a portion of the first substrate and comprises at least one metal oxide selected from oxides of one or more of Zn, Fe, Mn, Al, Ce, Sn, Sb, Hf, Zr, Ni, Zn, Bi, Ti, Co, Cr, Si, In, or combinations, mixtures or alloys thereof. A first electrochromic material is formed over at least a portion of the first conductive member and comprises poly(3-octylthiophene-2,5-diyl) and at least one additional layer selected from polyethylene dioxythiophene, polypropylene dioxythiophene, or polydimethyl propylene dioxythiophene. A second conductive member is formed over at least a portion of the second substrate and comprises at least one metal oxide selected from oxides of one or more of Zn, Fe, Mn, Al, Ce, Sn, Sb, Hf, Zr, Ni, Zn, Bi, Ti, Co, Cr, Si, In, or combinations, mixtures or alloys thereof. A second electrochromic material is formed over at least a portion of the second conductive member and comprises iron hexacyanoferrate. An ionic liquid is positioned between the first and second electrochromic materials.

DESCRIPTION OF THE PREFERRED EMBODIMENTS

Figure 1:
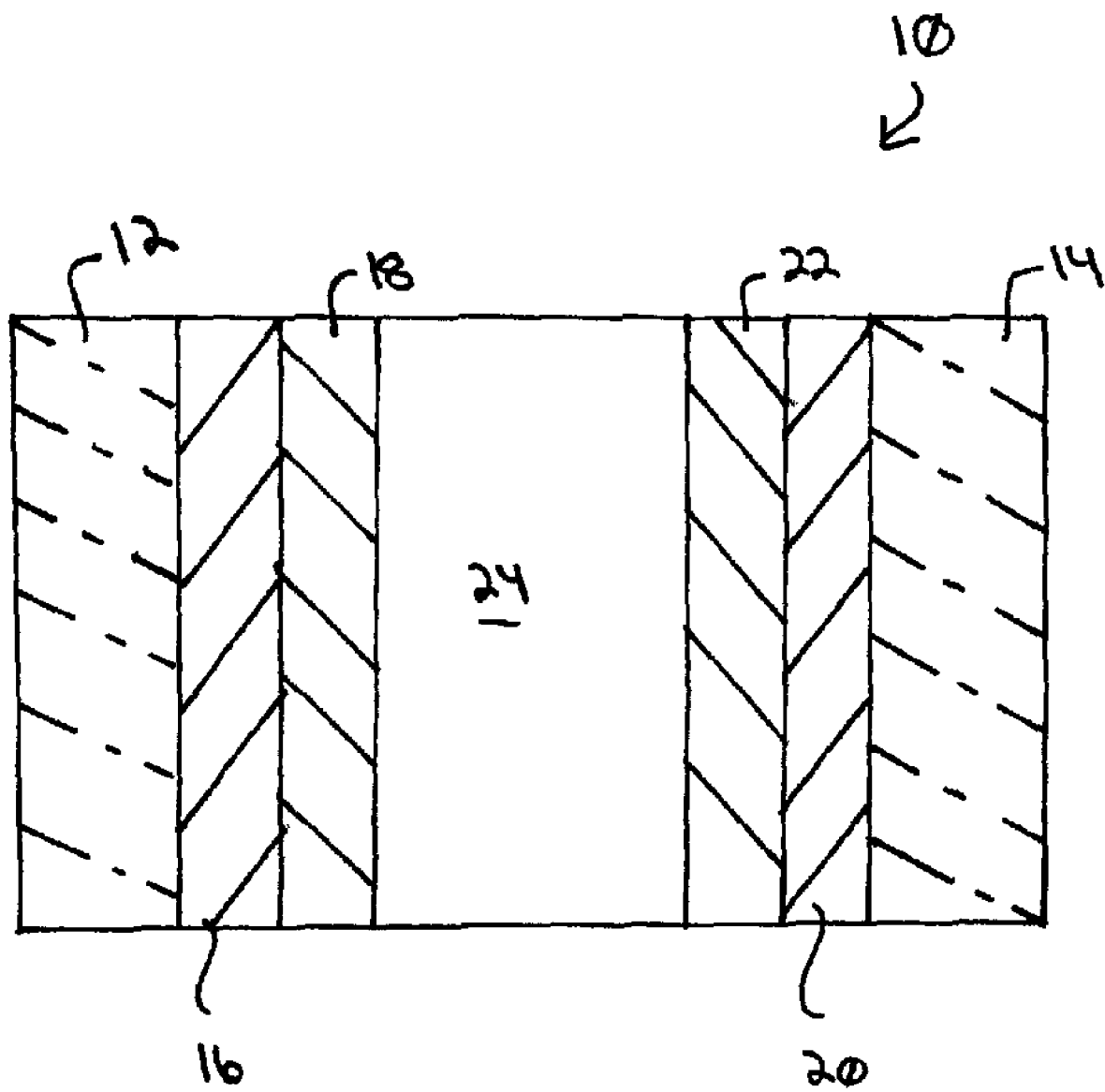
FIG. 1 is a side view (not to scale) of an electrochromic device incorporating features of the invention.

As used herein, spatial or directional terms, such as "left", "right", "inner", "outer", "above", "below", and the like, relate to the invention as it is shown in the drawing FIGURE. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on, but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 300 nm to less than 380 nm. Additionally, all documents, such as but not limited to, issued patents and patent applications, referred to herein are to be considered to be "incorporated by reference" in their entirety. The "visible transmission" and "dominant wavelength" values are those determined using conventional methods. Those skilled in the art will understand that properties such as visible transmission and dominant wavelength can be calculated at an equivalent even though the actual thickness of a measured glass sample is different than the standard thickness.

An electrochromic device 10 is illustrated in FIG. 1. The device 10 includes a first substrate 12 spaced from a second substrate 14. A first conductive member 16 is formed over at least a portion of the first substrate 12. A first electrochromic material 18 is formed over at least a portion of the first conductive member 16. The first electrochromic material comprises an organic material, as will be described below. A second conductive member 20 is formed over at least a portion of the second substrate 14. A second electrochromic material 22 is formed over at least a portion of the second conductive member 20. The second electrochromic material comprises an inorganic material. An ionic liquid 24 is positioned between the first electrochromic material 18 and the second electrochromic material 22.

In the broad practice of the invention, the substrates 12 and 14 can be of any desired material. Additionally, the substrates 12, 14 can be of the same or different materials. The substrates 12, 14 can include any desired material having any desired characteristics. For example, one or more of the substrates 12, 14 can be transparent or translucent to visible light. By "transparent" is meant having visible light transmission of greater than 0% up to 100%. Alternatively, one or more of the substrates 12, 14 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the substrates 12, 14 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. The first and second substrates 12, 14 can each be, for example, clear float glass or can be tinted or colored glass or one substrate 12, 14 can be clear glass and the other substrate 12, 14 colored glass. Although not limiting to the invention, examples of glass suitable for the invention are described in U.S. Pat. Nos. 4,746,347; 4,792,536; 5,030,593; 5,030,594; 5,240,886; 5,385,872; and 5,393,593. The first and second substrates 12, 14 can be of any desired dimensions, e.g., length, width, shape, or thickness. Non-limiting examples of glass that can be used for the practice of the invention include clear glass, Starphire®, Solargreen®, Solextra®, GL-20®, GL35™, Solarbronze®, and Solargray® glass, all commercially available from PPG Industries Inc. of Pittsburgh, Pa.

The first and second conductive members 16, 20 can be the same or different from each other. Examples of materials useful for the invention include conductive metal strips or conductive coatings. For example, the conductive members 16, 20 can be formed by one or more conductive metal oxide materials, such as one or more transparent conductive oxides, or a multi-layer conductive structure, such as a metal oxide/metal/metal oxide coating. Examples of transparent conductive oxides useful for the invention include, but are not limited to, oxides of one or more of Zn, Fe, Mn, Al, Ce, Sn, Sb, Hf, Zr, Ni, Zn, Bi, Ti, Co, Cr, Si, In, or a combination (e.g., mixture or alloy) thereof. In one particular embodiment, one or both of the conductive members 16, 20 can be indium tin oxide. Examples of multi-layer structures include coatings in the Solarban® and Sungate® families of coatings commercially available from PPG Industries, Inc. Specific coatings useful for the invention include Solarban® 60, Solarban® 70 and Sungate® 100 coatings. Examples of suitable coatings are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440.

For purposes of discussion only and not to be considered as limiting, the first electrochromic material 18 will be described as a cathodically coloring material and the second electrochromic material 22 will be described as an anodically coloring material. For purposes of discussion, an anodically coloring material changes color from light to dark when oxidized and from dark to light when reduced. A cathodically coloring material changes its color from light to dark when reduced and from dark to light when oxidized. Of course, in other embodiments, the first electrochromic material 18 could be an anodically coloring material and the second electrochromic material 22 could be a cathodically coloring material.

In the practice of the invention, the first electrochromic material 18 comprises one or more organic materials. Examples of suitable organic electrochromic materials include, but are not limited to, semi-conducting polymers.

Examples of suitable electrochromic polymers include, but are not limited to, polythiophenes and derivatives and polypyrroles and derivatives. Examples of electrochromic conductive polymers are found in, but not limited to, U.S. Pat. Nos. 6,667,825 and 6,828,062. In one non-limiting embodiment, the first electrochromic material 18 can include one or more layers of poly(3-octylthiophene-2,5-diyl), i.e. POT, commercially available from Reike Metals, Inc. One or more other layers can be applied over the POT. For example, the POT layer can be used as a substrate to electrochemically grow PEDOT (poly(2,3-dihydrothieno[3,4-b]-1,4-dioxin)), PPropOT (polypropylene dioxythiophene), or PPropOT-Me2 (polydimethyl propylene dioxythiophene).

In the practice of the invention, the second electrochromic material 22 comprises an inorganic material that changes color or transmittance under the application of an electrical potential. In one particular example, the second electrochromic material 22 includes iron hexacyanoferrate (conventionally referred to as "Prussian Blue"). Prussian Blue provides several advantages over known anodically coloring materials. For example, Prussian Blue is very stable under solar illumination, thus providing protection for the cathodically coloring material from ultraviolet radiation. Also, Prussian Blue is colorless in the reduced state and is blue in the oxidized state, thus increasing the overall contrast of the device.

The first electrochromic material 18 and second electrochromic material 22 can be applied in any conventional manner. For example but not to be considered as limiting, the POT can be spin-cast and then used as a substrate to electrochemically grow the other layers over the POT. The inorganic material can be electrodeposited from solution.

The ionic liquid 24 can be any conventional ionic liquid. Ionic liquids typically include nitrogen-containing or phosphorous-containing organic cations and inorganic anions. Examples of suitable ionic liquids include, but are not limited to, imidazolium, pyridinium, pyrrolidinium, phosphonium and ammonium. These materials are shown in Table 1.

TABLE 1

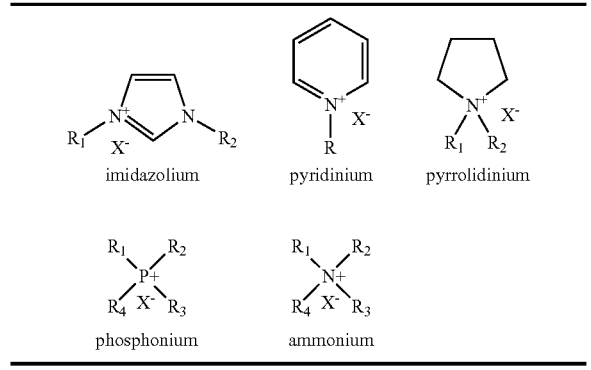

Examples of R include, but are not limited to, methyl, ethyl, propyl, butyl, octyl, and the like. In one non-limiting embodiment, R can be $C_1$ to $C_{25}$, such as $C_1$ to $C_{20}$, such as $C_1$ to $C_{15}$, such as $C_1$ to $C_{10}$. Examples of $X^-$ include, but are not limited to, $BF_4^-$, $PF_6^-$, $CF_3SO_3^-$, and $(C_4F_9)_3PF_3^-$.

In one non-limiting embodiment, the ionic liquid 24 is a room temperature ionic liquid. Room temperature ionic liquids are intrinsically fluid over a wide temperature range, e.g., $-100°$ C. to $500°$ C., typically require no solvent, and exhibit high ionic conductivity with a wide range of electrochemical stability. They are also typically non-volatile and non-flammable. Examples of some ionic liquids useful in the practice of the invention are found in U.S. Pat. Nos. 6,667,825 and 6,828,062. In one particular embodiment, the ionic liquid 24 can be [BMIM] $PF_6$ (1-butyl-3-methylimidazolium hexafluorophosphate). In one particular embodiment, the ionic liquid 24 can include nanoparticles to improve the uniformity and contrast of the electrochromic device 10 of the invention over conventional electrochromic devices. The nanoparticles can be produced by sputter-depositing the material in the ionic liquid 24. Examples of nanoparticles useful for the invention include, but are not limited to, tungsten oxide nanoparticles and/or zinc oxide nanoparticles.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An electrochromic device, comprising:
a first substrate spaced from a second substrate;
a first conductive member formed over at least a portion of the first substrate;
a first electrochromic material formed over at least a portion of the first conductive member, the first electrochromic material comprising an organic material;
a second conductive member formed over at least a portion of the second substrate;
a second electrochromic material formed over at least a portion of the second conductive member, the second electrochromic material comprising an inorganic material; and
an ionic liquid positioned between the first electrochromic material and the second electrochromic material,
wherein the first electrochromic material comprises one or more coloring semi-conducting polymers, the first electrochromic material comprises a multi-layer structure, and the first electrochromic material comprises poly(3-octylthiophene-2,5-diyl) and at least one additional layer selected from polyethylene dioxythiophene, polypropylene dioxythiophene, or polydimethyl propylene dioxythiophene.

2. The device of claim 1, wherein the first and second substrates comprise glass.

3. The device of claim 1, wherein at least one of the first and second conductive members includes at least one metal oxide selected from oxides of one or more of Zn, Fe, Mn, Al, Ce, Sn, Sb, Hf, Zr, Ni, Zn, Bi, Ti, Co, Cr, Si, In, or combinations, mixtures or alloys thereof.

4. The device of claim 1, wherein at least one of the first and second conductive members comprises indium tin oxide.

5. The device of claim 1, wherein the second electrochromic material comprises iron hexacyanoferrate.

6. The device of claim 1, wherein the ionic material includes nanoparticles.

7. The device of claim 6, wherein the nanoparticles are selected from tungsten oxide nanoparticles and/or zinc oxide nanoparticles.

8. An electrochromic device, comprising:
a first glass substrate spaced from a second glass substrate;
a first conductive member formed over at least a portion of the first substrate and comprising at least one conductive metal oxide;
a first electrochromic material comprising at least one semi-conducting cathodically coloring polymer formed over at least a portion of the first conductive member;

a second conductive member formed over at least a portion of the second substrate and comprising at least one conductive metal oxide;
a second electrochromic material formed over at least a portion of the second conductive member and comprising at least one inorganic material; and
an ionic liquid positioned between the first and second electrochromic materials,
wherein the first electrochromic material comprises a multi-layer structure, and the first electrochromic material comprises poly(3-octylthiophene-2,5-diyl) and at least one additional layer selected from polyethylene dioxythiophene, polypropylene dioxythiophene, or polydimethyl propylene dioxythiophene.

9. The device of claim 8, wherein at least one of the first and second conductive members includes at least one metal oxide selected from oxides of one or more of Zn, Fe, Mn, Al, Ce, Sn, Sb, Hf, Zr, Ni, Zn, Bi, Ti, Co, Cr, Si, In, or combinations, mixtures or alloys thereof.

10. The device of claim 9, wherein at least one of the first and second conductive members comprises indium tin oxide.

11. The device of claim 8, wherein the second electrochromic material comprises iron hexacyanoferrate.

12. The device of claim 8, wherein the ionic material includes nanoparticles selected from tungsten oxide nanoparticles and/or zinc oxide nanoparticles.

13. An electrochromic device, comprising:
a first glass substrate spaced from a second glass substrate;
a first conductive member formed over at least a portion of the first substrate and comprising at least one metal oxide selected from oxides of one or more of Zn, Fe, Mn, Al, Ce, Sn, Sb, Hf, Zr, Ni, Zn, Bi, Ti, Co, Cr, Si, In, or combinations, mixtures or alloys thereof;
a first electrochromic material comprising poly(3-octylthiophene-2,5-diyl) and at least one additional layer selected from polyethylene dioxythiophene, polypropylene dioxythiophene, or polydimethyl propylene dioxythiophene;
a second conductive member formed over at least a portion of the second substrate and comprising at least one metal oxide selected from oxides of one or more of Zn, Fe, Mn, Al, Ce, Sn, Sb, Hf, Zr, Ni, Zn, Bi, Ti, Co, Cr, Si, In, or combinations, mixtures or alloys thereof;
a second electrochromic material formed over at least a portion of the second conductive member and comprising iron hexacyanoferrate; and
an ionic liquid positioned between the first and second electrochromic materials.

* * * * *